United States Patent
Krueger et al.

(10) Patent No.: US 6,926,348 B2
(45) Date of Patent: Aug. 9, 2005

(54) REVERSIBLE VEHICLE LOAD FLOOR WITH BASIN

(75) Inventors: Eberhard Krueger, Lake Orion, MI (US); Preston Reynolds, Farmington Hills, MI (US); Jeffery E Long, Canton, MI (US); Al Maceri, Sterling Heights, MI (US); Dennis Walden, Clinton Township, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/739,629

(22) Filed: Dec. 18, 2003

(65) Prior Publication Data

US 2005/0088009 A1 Apr. 28, 2005

Related U.S. Application Data

(60) Provisional application No. 60/515,028, filed on Oct. 28, 2003.

(51) Int. Cl.[7] .............................................. B62D 25/20
(52) U.S. Cl. ................ 296/184.1; 296/37.1; 296/37.14; 296/182.1; 224/403; 224/404
(58) Field of Search ............................. 296/24.33, 37.1, 296/37.14, 37.16, 37.2, 37.8, 97.23, 182.1, 184.1; 224/42.35, 403, 404, 925

(56) References Cited

U.S. PATENT DOCUMENTS

| | | | | |
|---|---|---|---|---|
| 3,669,817 A | * | 6/1972 | McDevitt ..................... 428/82 |
| 4,303,367 A | * | 12/1981 | Bott ............................ 414/522 |
| 4,991,898 A | * | 2/1991 | Nomura ...................... 296/37.2 |
| 5,061,002 A | * | 10/1991 | Saso ........................... 296/37.3 |
| 5,094,375 A | * | 3/1992 | Wright ........................ 224/404 |
| 5,257,846 A | * | 11/1993 | Kanai et al. .............. 296/37.14 |
| 5,799,845 A | * | 9/1998 | Matsushita ............... 224/42.14 |
| 5,836,637 A | * | 11/1998 | Laginess et al. .............. 296/75 |
| 6,099,222 A | * | 8/2000 | Moore ......................... 410/100 |
| 6,113,172 A | * | 9/2000 | Chaloult et al. ......... 296/26.08 |
| 6,247,741 B1 | * | 6/2001 | Seel et al. ............... 296/37.14 |
| 6,375,055 B1 | * | 4/2002 | Spykerman et al. ........ 224/542 |
| 6,752,304 B1 | * | 6/2004 | Hotary et al. ............... 224/544 |

* cited by examiner

Primary Examiner—Lori L. Coletta
(74) Attorney, Agent, or Firm—Ralph E. Smith

(57) ABSTRACT

A vehicle includes an enclosed cargo area having a floor with a recessed area. A reversible load floor covers the recess, and includes a first, substantially flat surface and a second surface with a perimetric wall projecting therefrom. The reversible load floor is configured to cover the recess in a first position wherein the first surface is substantially flush with the surrounding floor, and in a second inverted position wherein the second surface is substantially flush with the surrounding floor. In the second position, the perimetric wall projects upwardly to form a basin for receiving cargo in a fluid tight manner to prevent spillage in the rest of the vehicle.

9 Claims, 2 Drawing Sheets

REVERSIBLE VEHICLE LOAD FLOOR WITH BASIN

This application claims the benefit of provisional application No. 60/515,028, filed Oct. 28, 2003.

FIELD OF THE INVENTION

The present invention relates to cargo systems and more particularly to a reversible load floor for use in the rear cargo compartment of a vehicle.

BACKGROUND OF THE INVENTION

Motor vehicles having a rear hatch, for example, a van, minivan, SUV or station wagon, have been designed to provide the functionality of a truck with the comfort level of a car. Unlike a truck, the owners of motor vehicles with rear hatches cannot clean their many cargo areas by simply going through a car wash nor can they haul liquids without the fear of a spill destroying their interior. Instead owners of vehicles with rear hatches must use extra caution when hauling materials that are likely to stain or spill in their cargo area, and some choose not to haul them at all. This results in reducing the functionality of the cargo area and makes these vehicles undesirable to those who would like to use their cargo areas more like a truck bed. Accordingly, a need exists for a motor vehicle having a rear hatch and a load floor capable of carrying liquids or messy materials.

SUMMARY OF THE INVENTION

The present invention provides a reversible load floor for a motor vehicle having an enclosed rear cargo area and a floor with an opening. The reversible load floor has a first side and a second side. The second side includes a basin for receipt of cargo therein. The second side of the reversible load floor is retained in the opening of the floor in a first position such that the first side of the reversible load floor is substantially planar to the floor.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
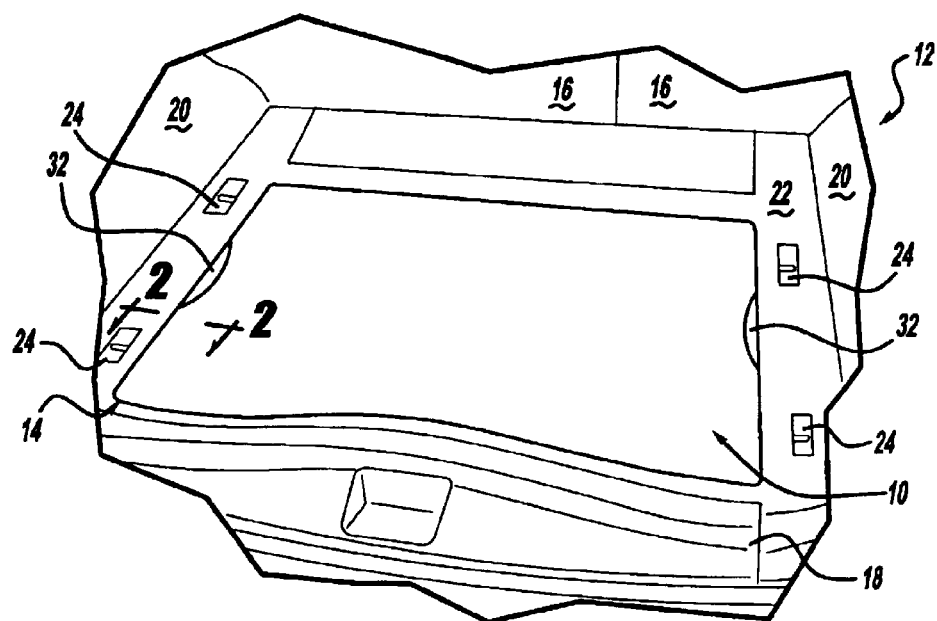
FIG. 1 is a perspective view of a vehicle with a reversible load floor in a stowed position according to the principles of the present invention.
Figure 2:
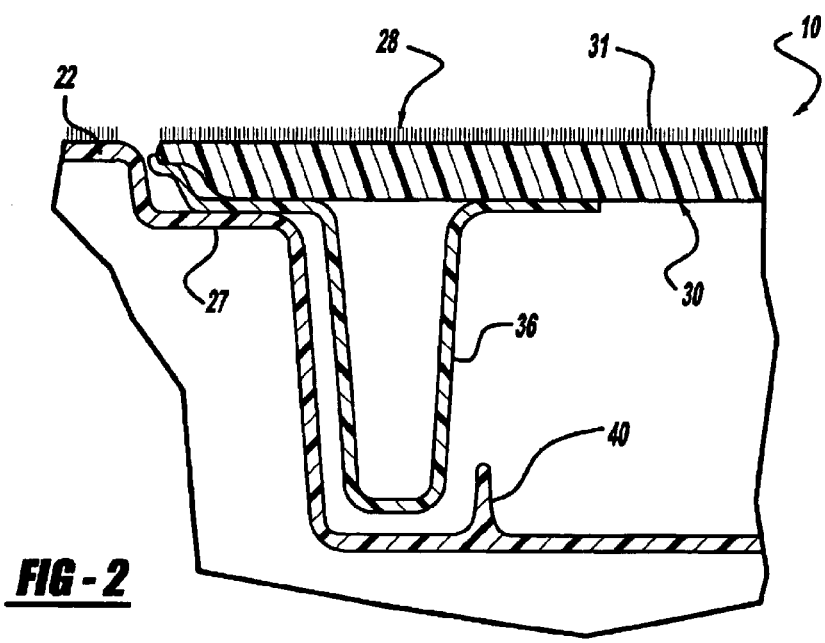
FIG. 2 is a partial cross sectional view of the load floor of FIG. 1 along line 2—2.

Referring to FIGS. 1–4, a reversible load floor 10 for a vehicle 12 is shown in a stowed position. The vehicle 12 includes a rear cargo area 14 positioned between a rear seat 16 and a sill 18. The rear cargo area 14 is further adjacent to wheel wells 20. The rear cargo area 14 also includes a floor 22. The floor 22 includes a plurality of tie-downs 24 for securing the reversible load floor 10 in a use position. The floor 22 surrounds and supports the reversible load floor 10 via an opening 26 as shown in FIG. 2.

The reversible load floor 10 has a first side 28 and a second side 30. The reversible load floor 10 is typically made from polypropylene, although similar materials could be used. The first side 28 is substantially co-planar with the floor 22 when the reversible load floor 10 is in a stowed position, as shown in FIGS. 1 and 2. The first side 28 is configured to match the floor 22 and may include a layer of carpet 31. The layer of carpet 31 is generally compression molded to the first side 28. The first side 28 further includes cutouts 32 formed into the first side 28 to enable a user to remove the reversible load floor 10 from the floor 22.

The second side 30 of the reversible load floor 10 is adapted to conform with the opening 26 in the floor 22 when the reversible load floor 10 is in a stowed position shown in FIGS. 1–2. In particular, the perimeter of opening 26 includes a ledge 27 adapted to support second side 30 of load floor 14 in the stowed position.

Figure 3:
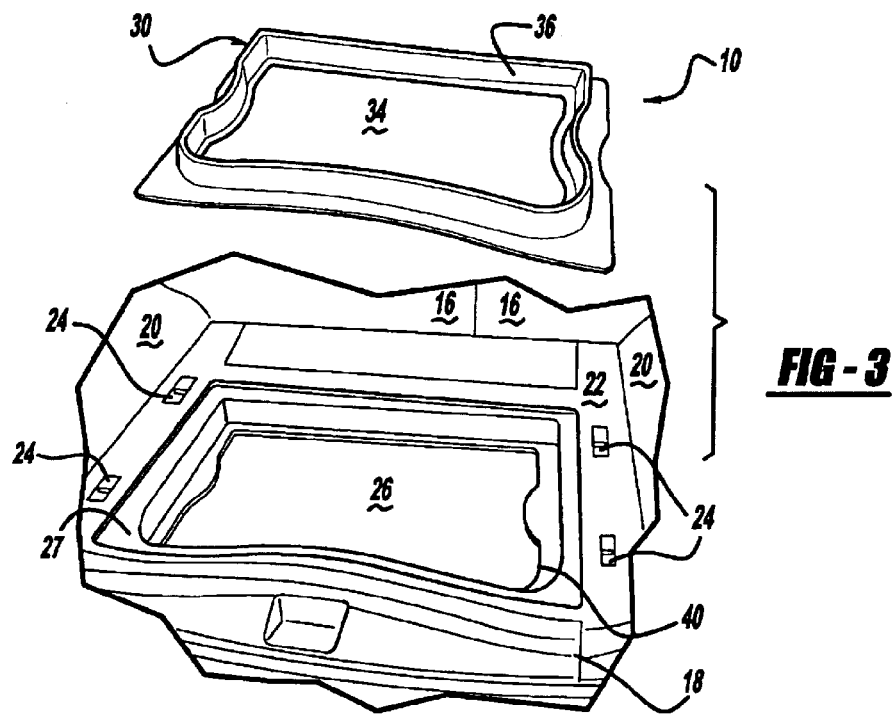
FIG. 3 is an exploded perspective view of the load floor of FIG. 1.
Figure 4:
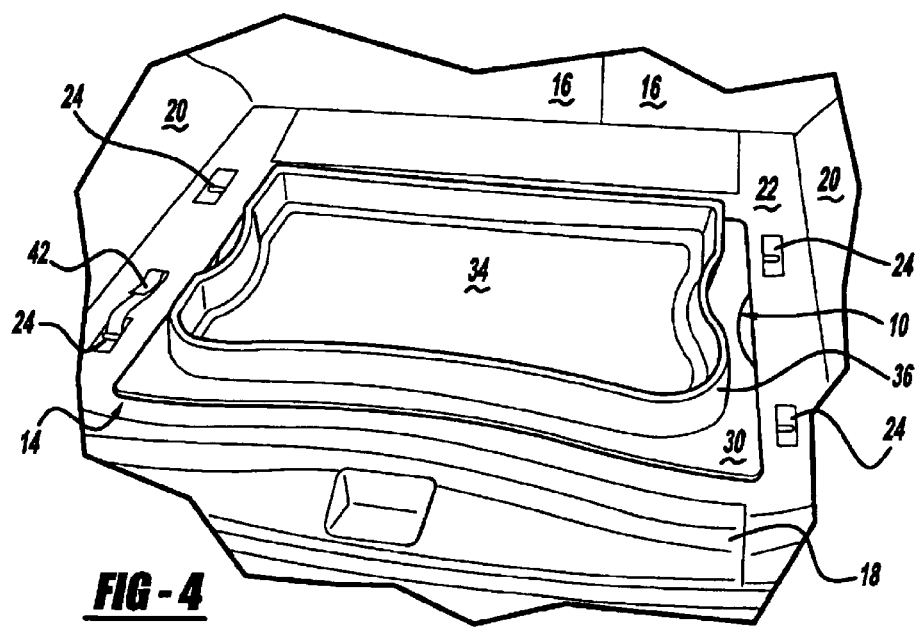
FIG. 4 is a perspective view of the load floor in a reverse position.

Second side 30 of reversible load floor 10 includes a basin 34, shown in FIGS. 3–4. The basin 34 extends to cover the majority of the reversible load floor 10. The basin 34 is defined by a perimeter wall 36. The wall 36 is compression molded to the second side 30 to form a fluid tight receptacle for the storage of goods. Additionally, a sealant (not shown) can be used to further waterproof the seam between the wall 36 and the second side 30.

Referring again to FIG. 2, basin 34 is concealed within the opening 26 in the floor 22 when not in use. A ridge 40 protruding from the bottom of opening 26 serves to locate the wall 36 within the opening 26 and to prevent load floor 10 from being dislodged. Opening 26 is shown empty, but it is anticipated that this area can be used for cargo also, or for storage of emergency equipment such as a spare tire and jack.

In order to move basin 34 into the use position, a user grasps the reversible load floor 10 at cutouts 32 to lift the load floor 10 from the floor 22. By inverting the reversible load floor 10 from the stowed position, the basin 34 is in the use position. The reversible load floor 10 is then lowered into the use position, with the first side 28 supported by ledge 27 as shown in FIG. 4.

With reference to FIG. 4, the reversible load floor 10 is illustrated in its use position. Straps 42 can be attached to the tie-downs 24 and routed over the basin 34 to secure the basin 34 and cargo retained therein. By way of example, the straps 42 can secure a large object such as a potted plant within basin 34 to prevent it from overturning. The flexibility of the reversible load floor 10 enables the transportation of an array of items without the fear of damage or spillage in the interior of the rear cargo area.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A reversible load floor system far use in a cargo area of a motor vehicle, the reversible load floor comprising:

a first substantially planar side and an opposed second side having a basin for receipt of cargo;

an upwardly opening cavity in the cargo area floor having an upwardly protruding annular ridge to align the basin of the second side of the load floor within the opening when the second side faces the cavity;

the load floor adapted to matingly engage the cavity such that the first side is substantially coplanar with the cargo area floor when facing upwardly from the cavity, and such that the basin opens upwardly from the cargo area floor whenever the load floor is placed with the first side facing the cavity.

2. The reversible load floor system of claim 1 further comprising at least one for securing the reversible load floor to the cargo area floor.

3. The reversible load floor system of claim 1 further comprising at least one cutout for grasping the reversible load floor to remove the reversible load floor from mating engagement with the cavity.

4. The reversible load floor system of claim 1 wherein the first side further comprises a covering substantially similar to a covering of the cargo area floor surrounding the cavity.

5. The reversible load floor system of claim 1 wherein the basin is watertight.

6. A motor vehicle comprising:

a cargo area having a substantially horizontal floor;

a reversible load floor having a first substantially planar first side and an opposing second side having a basin for receipt of cargo;

an upwardly opening cavity in the cargo area floor having an upwardly protruding annular ridge to align the basin of the second side of the load floor within the opening when the second side faces the cavity; and the load floor matingly engaging the cavity such that the first side is substantially coplanar with the cargo area floor when facing upwardly from the cavity, and such that the basin opens upwardly from the cargo area floor whenever the load floor is placed with the first side facing the cavity.

7. The motor vehicle of claim 6 wherein the cargo area floor has at least one strap to secure the reversible load floor to the cargo area floor.

8. The motor vehicle of claim 6 further comprising at least one cutout for grasping the reversible load floor to remove the reversible load floor from mating engagement with the cavity.

9. The motor vehicle of claim 6 herein the basin is watertight.

* * * * *